United States Patent
Arya et al.

(10) Patent No.: US 10,922,097 B2
(45) Date of Patent: Feb. 16, 2021

(54) COLLABORATIVE MODEL EXECUTION

(71) Applicant: International Business Machines Corporation, Armonk, NY (US)

(72) Inventors: Vijay Arya, Bangalore (IN); Sayandeep Sen, Bangalore (IN); Palanivel A. Kodeswaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 16/134,672

(22) Filed: Sep. 18, 2018

(65) Prior Publication Data
US 2020/0089509 A1    Mar. 19, 2020

(51) Int. Cl.
| | |
|---|---|
| *H04L 9/06* | (2006.01) |
| *G06F 16/18* | (2019.01) |
| *G06F 9/448* | (2018.01) |
| *H04L 29/08* | (2006.01) |
| *H04L 29/06* | (2006.01) |

(52) U.S. Cl.
CPC ........ *G06F 9/4482* (2018.02); *G06F 16/1805* (2019.01); *H04L 9/0643* (2013.01); *H04L 63/0428* (2013.01); *H04L 67/10* (2013.01); *H04L 2209/38* (2013.01)

(58) Field of Classification Search
CPC .............................. H04L 9/0643; H04L 67/10
See application file for complete search history.

(56) References Cited

U.S. PATENT DOCUMENTS

| | | | |
|---|---|---|---|
| 10,013,412 B2 | 7/2018 | McKenzie et al. | |
| 10,303,879 B1* | 5/2019 | Potlapally | ............... G06F 21/74 |
| 2004/0177110 A1* | 9/2004 | Rounthwaite | ........... H04L 51/12 |
| | | | 709/202 |
| 2014/0317293 A1* | 10/2014 | Shatzkamer | ........ G06F 9/45558 |
| | | | 709/226 |
| 2017/0054611 A1* | 2/2017 | Tiell | .................... H04L 43/0876 |
| 2017/0118301 A1* | 4/2017 | Kouru | ..................... H04L 67/06 |
| 2017/0161829 A1* | 6/2017 | Mazier | .................. G06Q 40/06 |
| 2017/0316391 A1* | 11/2017 | Peikert | ............... G06Q 20/1235 |
| 2017/0352027 A1* | 12/2017 | Zhang | ................ G06Q 20/3678 |

(Continued)

FOREIGN PATENT DOCUMENTS

WO    2018035216 A1    2/2018

OTHER PUBLICATIONS

Anonymous, Akash Network: Decentralized Cloud Infrastructure Marketplace. Overclock Labs (2018).

(Continued)

*Primary Examiner* — Ali Shayanfar

(57) ABSTRACT

An example operation may include one or more of receiving, at a node, a request to execute a software model that has been decomposed into a plurality of sequential sub-components, executing a sub-component from among the plurality of sub-components based on input data included in the received request to generate output data, hashing the input data and the output data to generate a hashed execution result of the sub-component, and storing the hashed execution result of the sub-component within a block among a hash-linked chain of blocks which include hashed execution results of other sub-components of the software model executed by other nodes.

18 Claims, 14 Drawing Sheets

(56) References Cited

U.S. PATENT DOCUMENTS

| | | | | |
|---|---|---|---|---|
| 2019/0080392 A1* | 3/2019 | Youb | ............... | G06F 16/1805 |
| 2019/0215149 A1* | 7/2019 | Ramasamy | ......... | H04L 67/1036 |
| 2019/0220831 A1* | 7/2019 | Rangarajan | ............ | G06Q 20/36 |
| 2019/0349426 A1* | 11/2019 | Smith | ................... | H04L 67/104 |
| 2020/0013229 A1* | 1/2020 | Lee | ...................... | G06F 9/542 |
| 2020/0036712 A1* | 1/2020 | Soundararajan | .... | H04L 63/0823 |
| 2020/0042987 A1* | 2/2020 | Snow | ................ | G06Q 20/0658 |
| 2020/0044831 A1* | 2/2020 | Soundararajan | ...... | H04L 9/3297 |

OTHER PUBLICATIONS

Klems et al. "Trustless Intermediation in Blockchain-Based Decentralized Service Marketplaces." International Conference on Service-Oriented Computing. Springer, Cham, 2017.

Tai, "Continuous, trustless, and fair: Changing priorities in services computing" European Conference on Service-Oriented and Cloud Computing. Springer, Cham, 2016.

Zyskind et al., . "Enigma: Decentralized computation platform with guaranteed privacy." arXiv preprint arXiv:1506.03471 (2015).

\* cited by examiner

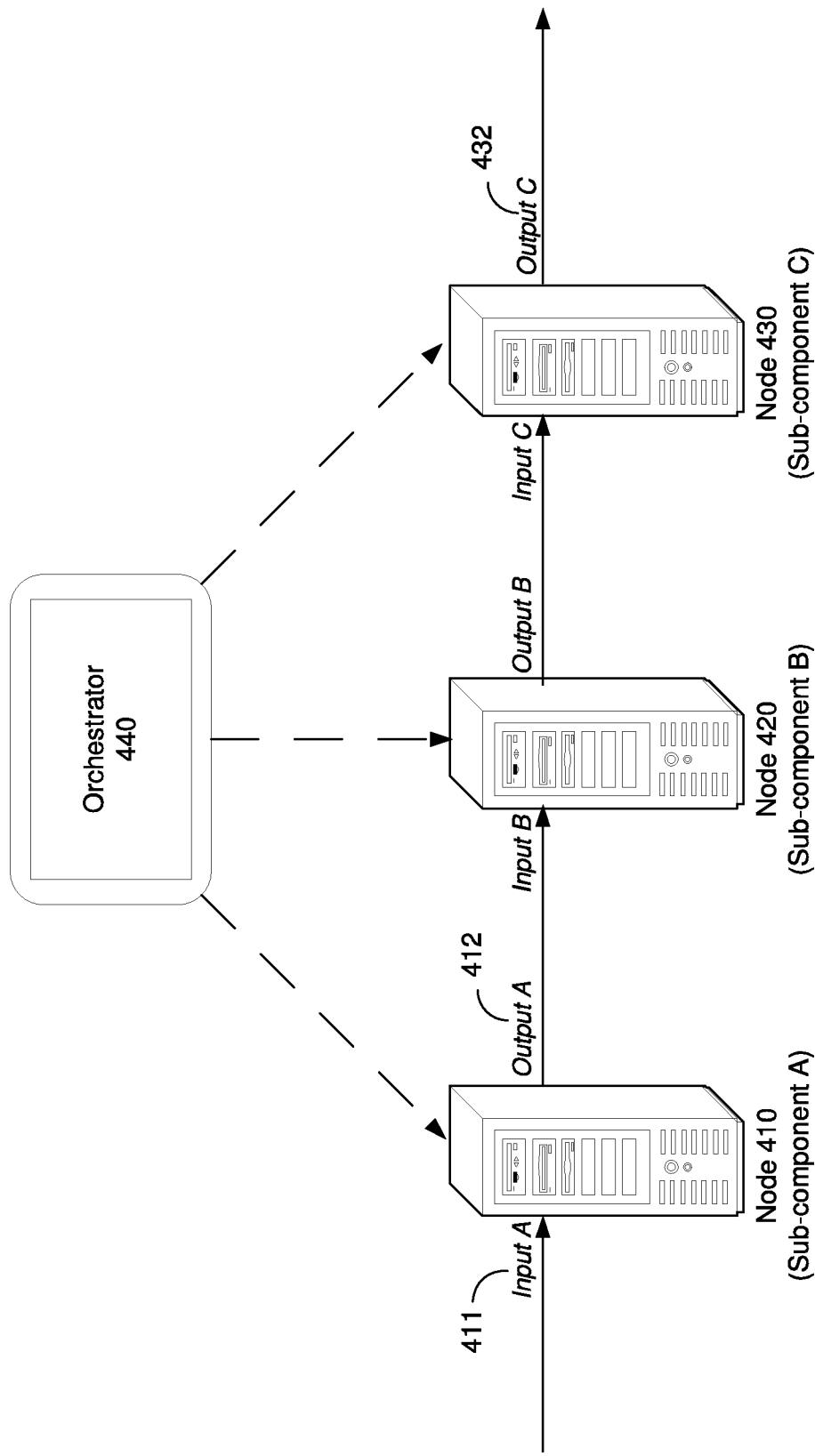

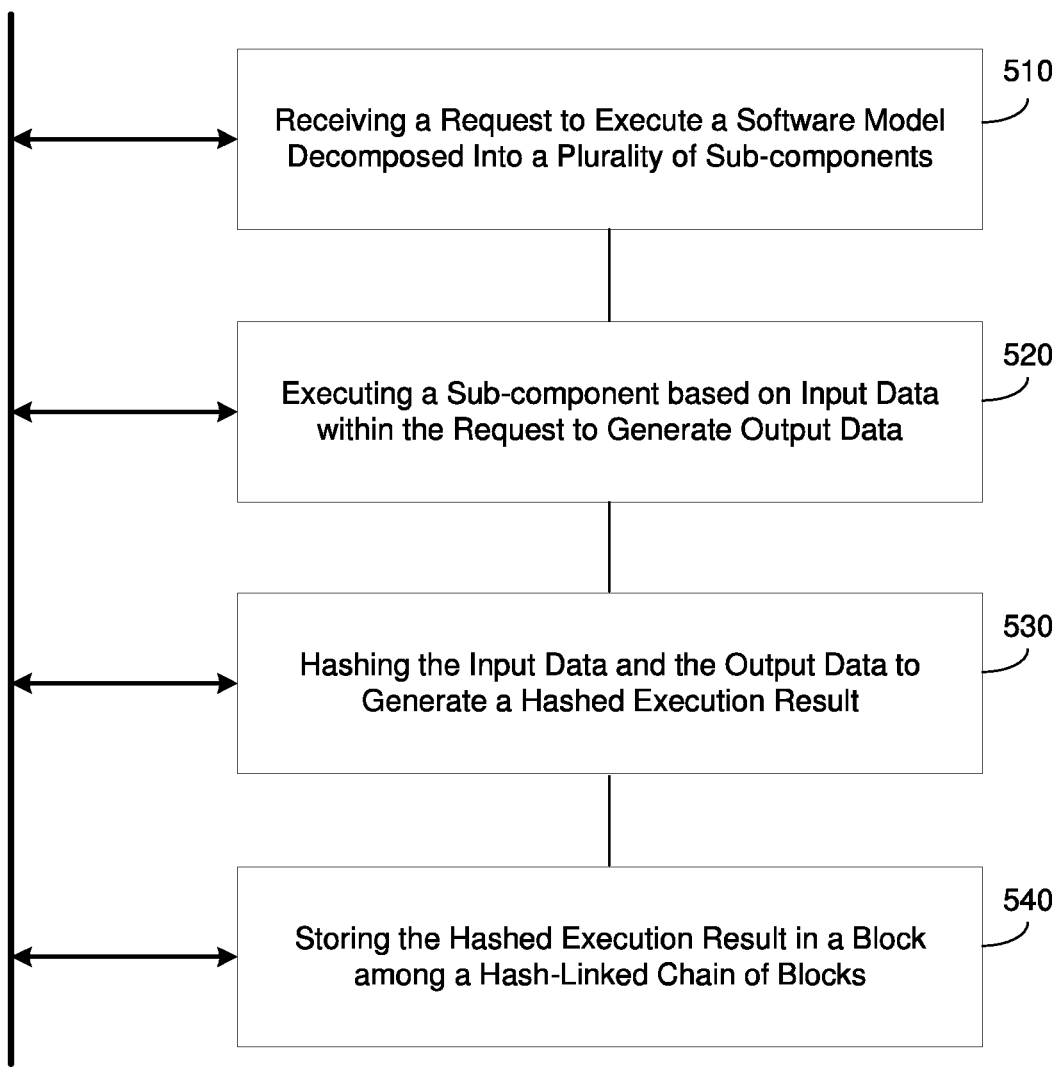

600

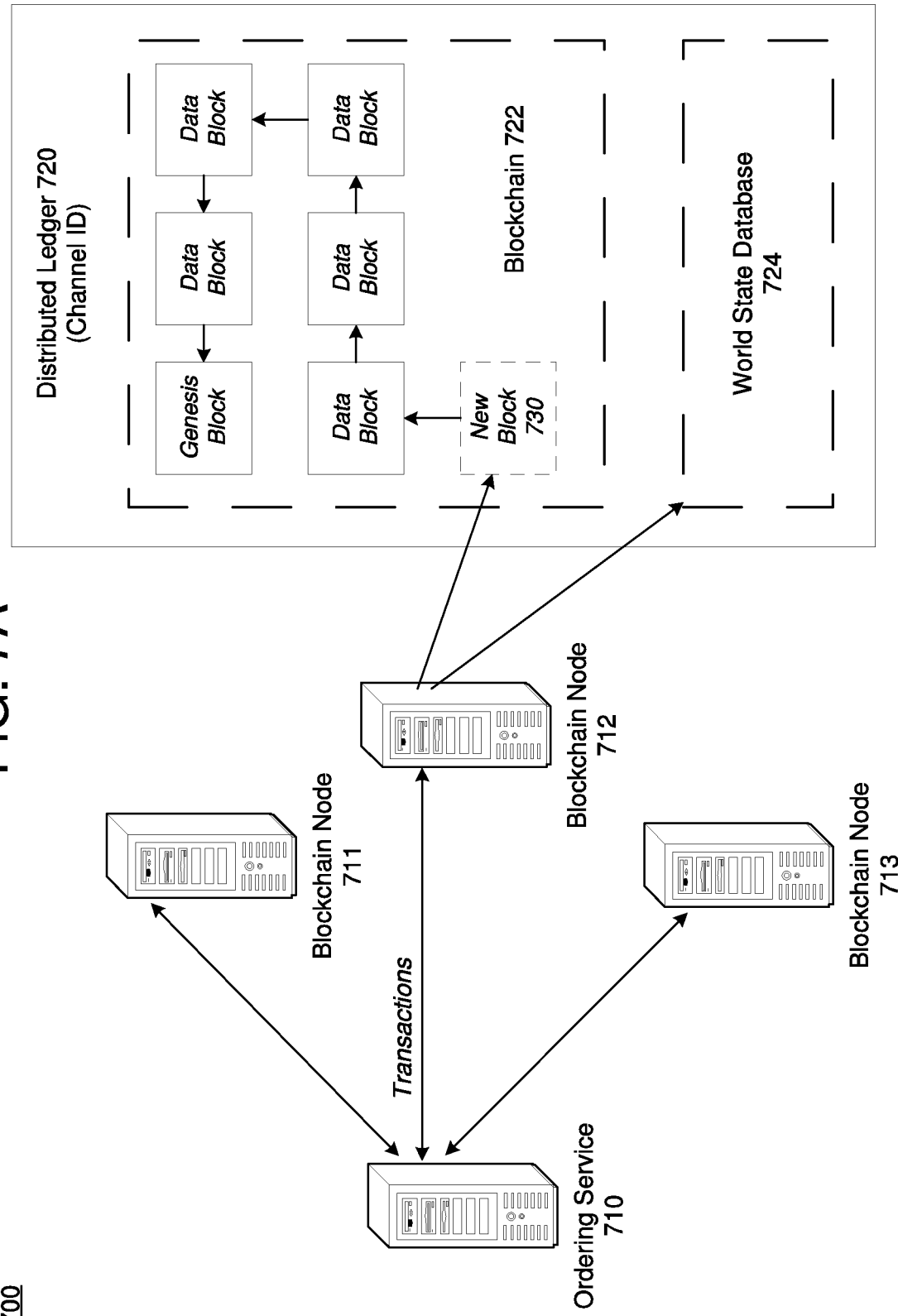

US 10,922,097 B2

COLLABORATIVE MODEL EXECUTION

TECHNICAL FIELD

This application generally relates to a database storage system, and more particularly, to a decentralized database such as a blockchain in which a software model is decomposed into a plurality of sub-components which are distributed among a plurality of nodes such that no single node has access to the entire software model.

BACKGROUND

A centralized database stores and maintains data at one location. This location is often a central computing system such as a server or a mainframe computer. Information stored on a centralized database is typically accessible from multiple different points. For example, multiple users or client workstations can work simultaneously on the centralized database based on a client/server configuration. Because of its single location, a centralized database is easy to manage, maintain, and control, especially for purposes of security. Within a centralized database, data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks can occur when the centralized database experiences high traffic. Furthermore, the centralized database provides limited access to data because only one active/productive copy of the data is maintained. As a result, multiple users may not be able to access the same piece of data at the same time without creating problems such as overwriting necessary data. Furthermore, because a central database has minimal to no data redundancy, if a set of data is unexpectedly lost can be difficult to retrieve other than through manual operation from back-up disk storage.

Recently, vendors (such as cloud providers) have begun offering software models (e.g., predictive analytics, artificial intelligence, etc.) on-demand through a software marketplace, enabling clients to access the models on a per-need basis. The models may be created by the vendors or they may be created and managed by third parties. However, the interaction between vendors, model owners, and model users lacks trust. In particular, a malicious vendor may copy the deployed model supplied by the model owner and offer a similar service or invoke the model without reporting to the model owner. Meanwhile, a malicious model owner may backtrack and deny query results of a certain version of the deployed AI model, provide incorrect models, or blame the vendor for issues. Furthermore, a malicious model user may demand a refund by claiming that a wrong output was provided by the service (using a forged output). Accordingly, a mechanism is needed for ensuring trust in a model execution environment.

SUMMARY

Another example embodiment may provide a system that includes one or more of a network interface configured to receive a request to execute a software model that has been decomposed into a plurality of sequential sub-components, and a processor configured to one or more of execute a sub-component from among the plurality of sub-components based on input data included in the received request to generate output data, hash the input data and the output data to generate a hashed execution result of the sub-component, and store the hashed execution result of the sub-component within a block among a hash-linked chain of blocks which include hashed execution results of other sub-components of the software model executed by other nodes.

One example embodiment may provide a method that includes one or more of receiving, at a node, a request to execute a software model that has been decomposed into a plurality of sequential sub-components, executing a sub-component from among the plurality of sub-components based on input data included in the received request to generate output data, hashing the input data and the output data to generate a hashed execution result of the sub-component, and storing the hashed execution result of the sub-component within a block among a hash-linked chain of blocks which include hashed execution results of other sub-components of the software model executed by other nodes.

A further example embodiment may provide a non-transitory computer readable medium comprising instructions, that when read by a processor, cause the processor to perform one or more of receiving, at a node, a request to execute a software model that has been decomposed into a plurality of sequential sub-components, executing a sub-component from among the plurality of sub-components based on input data included in the received request to generate output data, hashing the input data and the output data to generate a hashed execution result of the sub-component, and storing the hashed execution result of the sub-component within a block among a hash-linked chain of blocks which include hashed execution results of other sub-components of the software model executed by other nodes.

BRIEF DESCRIPTION OF THE DRAWINGS

FIG. 4 is a diagram illustrating a process of sequentially executing a software model via sub-components according to example embodiments.

FIG. 5 is a diagram illustrating a method of executing a sub-component of a software model, according to example embodiments.

FIG. 7A is a diagram illustrating a process of a new block being added to a blockchain ledger, according to example embodiments.

DETAILED DESCRIPTION

Figure 1A:
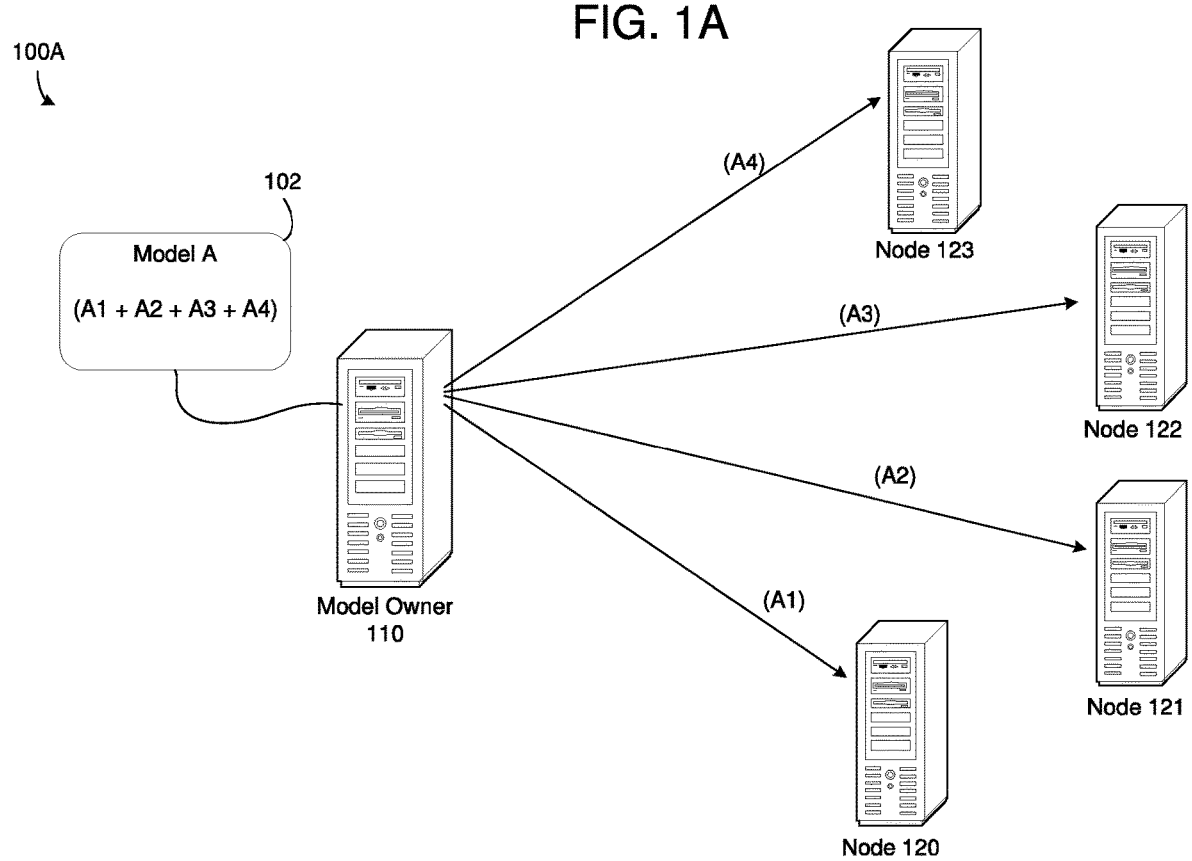
FIGS. 1A and 1B are diagrams illustrating a blockchain environment for implementing trusted model execution, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide a decentralized storage system (e.g., a blockchain, etc.) in which a software model is decomposed into sub-components and distributed among a plurality of computing nodes for split execution. As a result, a single computing node does not have access to the entire software model.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties may be referred to herein as peers or nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal, but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts trans-action-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Recently, vendors (such as cloud providers) have begun offering software models (e.g., predictive analytics, artificial intelligence, etc.) on-demand, enabling clients to pay for use of access to the models on a per-use basis. The models may be created by model owners, hosted by the cloud vendors, and accessed by end users via a software model marketplace such as an artificial intelligence (AI) marketplace. Currently, in a centralized model marketplace setting, AI model developers deploy their models on the cloud, which is maintained by a trusted third party such as a cloud vendor. Application developers (or end users) invoke model execution via application programming interfaces (APIs) of the respective models. This environment is prone to fraud/malpractice by model developers, application developer end users, and cloud vendors. This system is also prone to unfairness as the value derived from invocations of model APIs might not be shared commensurately between the model developers and the cloud vendors.

The example embodiments overcome these drawbacks by enabling the functionality of a decentralized model marketplace without relying on trusting a central entity thereby avoiding these problems. A model owner or other entity may decompose a software model such as an artificial intelligence model, predictive analytic model, or the like, into a plurality of sub-components. Here, the model owner may split the model into sequential sub-components and distribute the sub-components across a plurality of nodes (such as cloud vendors) such that no single node has access to all sub-components other than its sub-component. In this way, no single vendor has the ability to defraud the model owner. During execution, each vendor may execute their sub-component using input data based on an output of the previous sub-component which may be provided from the previous vendor, an orchestrator, or the like. The input and output pairs of each sub-component may be stored by each vendor via a blockchain thus creating an immutable record which can be audited to verify that the model performed as was expected. Therefore, a model user cannot maliciously assert that the model did not satisfy user requirements. Likewise, the storage of the model results on the blockchain can prevent a model owner from defrauding a model user by not executing the model and claiming they did.

Some benefits of the instant solutions described and depicted herein include increasing the trust associated with the use of software models via an open AI marketplace, etc. In particular, execution results of the model may be stored on an immutable and auditable ledger which is distributed among the nodes (e.g., vendors, cloud providers, etc.). The execution results can be verified to ensure that the model performed as was expected. Furthermore, the execution results can be verified to prove that the results of the model were provided to the end user. Furthermore, no single node can have access to the entire model thereby preventing fraud or theft of the model from occurring.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

According to various aspects, each participant records their transactions on the blockchain. The (immutable) blockchain ledger provides verifiability of actions performed by each participant in the model marketplace, thereby providing accountability and evidence of wrongdoing or its resolution by an arbitrator. Each participant may interact with the blockchain system using smart contracts (also referred to as chaincode), which are invoked to record their transactions on blockchain. The model to be deployed on the system may be split and distributed across multiple cloud vendors, so that no single cloud vendor has full knowledge of the model. Therefore privacy of the deployed model is maintained.

According to various embodiments, the distributed system enables the functioning of a decentralized model market place without any trusted central entity. In one example, the models may be split and distributed across multiple cloud vendors and model invocations may managed collaboratively in a decentralized manner by all cloud vendors. Distribution of the split models across multiple cloud venders can increase accessibility and provide protection against failures of a few cloud vendors. Furthermore, endorsement processes can ensure that transactions are valid and ensure the validity of the underlying blockchain ledger. As such, the system herein may work on top of an existing blockchain structure.

The example embodiments provide numerous benefits over a traditional database. For example, the blockchain enables trust in an open model marketplace where model owners, model users, and vendors can act maliciously. Meanwhile, a traditional database could not be used to implement the example embodiments because a traditional database is prone to fraud and unfairness, can lead to loss of model privacy, and requires a trusted central entity because a single central authority maintains control over the marketplace. In contrast, due to the inherent properties of a blockchain, a model may be split and distributed across multiple independent parties who collaboratively manage model storage and invocations and record transactions on blockchain. Accordingly, the example embodiments provide for a specific solution to a problem of trust within a marketplace.

Figure 1B:
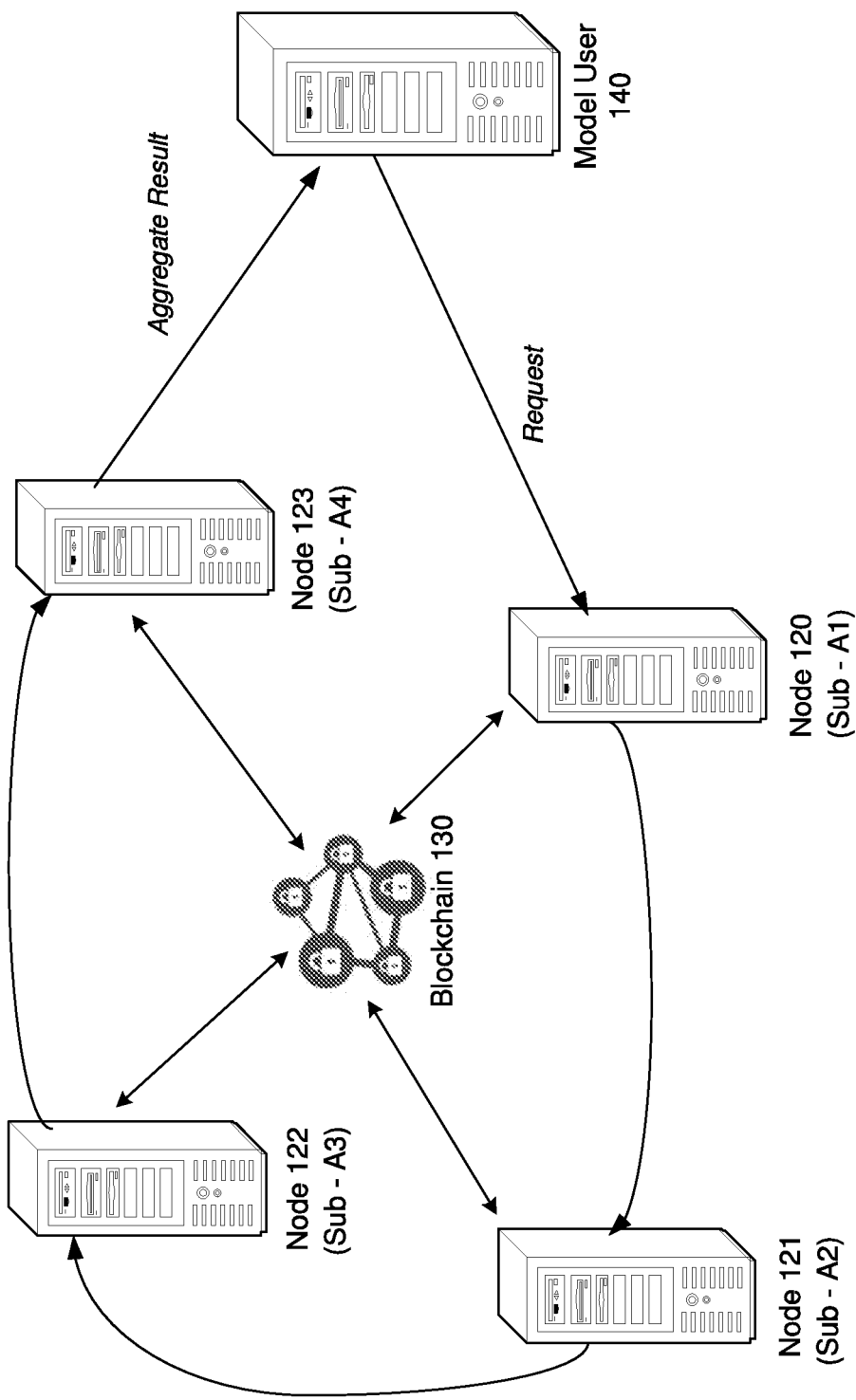

FIG. 1A illustrates an environment 100A where a software model is decomposed and distributed in sub-components among a plurality of nodes, according to example embodiments, and FIG. 1B illustrates an environment 100B where a model user requests distributed execution of the software model, according to example embodiments. Referring to the environment 100A in FIG. 1A, a software model A 102, for example, an artificial intelligence program, a predictive analytic, and the like, may be decomposed into a plurality of subcomponents A1, A2, A3, and A4 by a model owner 110. The decomposition may be performed by the model owner 110 or by another entity such as an orchestrator (not shown). Sub-components may be determined based on natural transitions within the model such as different algorithms, different parts of an algorithm, and the like.

The model 102 may be split into sub-components using several techniques. For example, for neural network models, each layer or a stack of layers may reside on a node from among the nodes 120-123 so that the forward propagation step needed for inference may be executed successively by each node and no individual node has full knowledge of the neural network model. As another example, for decision tree models, each node or a subtree corresponding to the model can reside on a separate node 120-123, effectively connecting invocations of the nodes in a tree structure. Most AI models that yield high accuracy are essentially meta/ensemble models that are based on several weaker independent models. In this setting, each weak model or a group of weaker models may reside on a respective node from the group of nodes 120-123. In an alternative approach, an orchestrator can be used to invoke the execution of the sub-components. In this example, the orchestrator may invoke a different subset of nodes on each API call, a set of weaker models may be placed at each node. The compute step of combining results of multiple models obtained from different nodes 120-123 (e.g. via any mathematical function—e.g. averaging) can also be split across multiple nodes.

Referring to the example of FIG. 1A, after decomposition, each subcomponent may be distributed to a node such that no node receives all of the sub-components. In this example, each of a plurality of peer nodes 120-123 may receive a different respective sub-component of the software model A 102. As a non-limiting example, the nodes 120-123 may be cloud vendors that provide cloud services, however, embodiments are not limited thereto. In this example, node 120 receives sub-component A1, node 121 receives sub-component A2, node 122 receives sub-component A3 and node 123 receives sub-component A4. It should also be appreciated that a different ratio of sub-components may be distributed. For example, one node may receive more than one sub-component and one or more nodes may not receive any sub-components. Accordingly, each node 120-123 may store its respective sub-component without divulging the sub-component to the other nodes. Furthermore, each of the nodes 120-123 may share access to a common distributed ledger which includes a blockchain 130 (shown in FIG. 1B) that is replicated among the nodes 120-123.

Referring to environment 100B in FIG. 1B, a model user 140 such as an application developer, a user, etc. requests execution of the software model A 102. For example, the model user 140 may store a request to execute the model on the blockchain 130 or transmits the request to a first node 120 among the plurality of nodes 123. The request may include a data file from the model user 140 with the data to be processed via the model 102. In response to detecting the request, the first node 120 having the first sub-component of the model 102 executes the first sub-component of the model 102 on the received data file to generate a partial result, and stores a hash of its partial result via the blockchain 130. In response to detecting or otherwise being notified that the previous node has finished executing its part of the model, each of the peer nodes 121, 122, and 123 repeats the process in sequential order based on the output of the previous node in the sequence, until all of the sub-components of the model are fully executed. After each execution, a nodes store its partial result via a separate blocks of the blockchain 130.

A smart contract disposed on the final node 123 (or another entity with access to the blockchain 130) may aggregate the partial results together and verify the correctness of the execution by the different nodes 120-123 and output the aggregated results to the model user 140. The results may be communicated to the end user by the last node 123 while only a hash is stored on the blockchain 130 for verification. Here, the smart contract may verify the completeness of the execution of the model A, by verifying a sequence of operations through hash-matches and ensure all sub-components (A1, A2, A3, and A4) are executed and record the completeness via the blockchain 130. Furthermore, the smart contract may verify correctness by verifying each node runs the right code for its component through hash-match with a hash of the code provided by the model owner 110 and store the correctness via the blockchain 130.

In some embodiments, the model owner 110, the model user 140, and the nodes 120-123 may access and store data on the blockchain 130. For example, the model owner 110 may store an identification of the decomposition of the model A 102 into components A1, A2, A3, and A4, and a unique model signature, for example, a Merkle root of the sub-components. Each of the nodes 120-123 may store a hash of input data ($D_i$) and output data ($D_o$) used by the respective node when executing its sub-component on the blockchain 130. Here, the sequence of input and output hash-matches between pairs of nodes 120-123 describes the sequence in which operations are carried out. Additionally, each of the nodes 120-123 may record a hash of the source code of the sub-component of the model that is executed by the node on the blockchain 130. The end user 140 may register a hash of the input provided to the first node 120 on the blockchain 130. Furthermore, the model user 140 may verify that the input is the input hash for the first node 120, and verify the output of the last node 123 in the sequence.

Figure 2A:
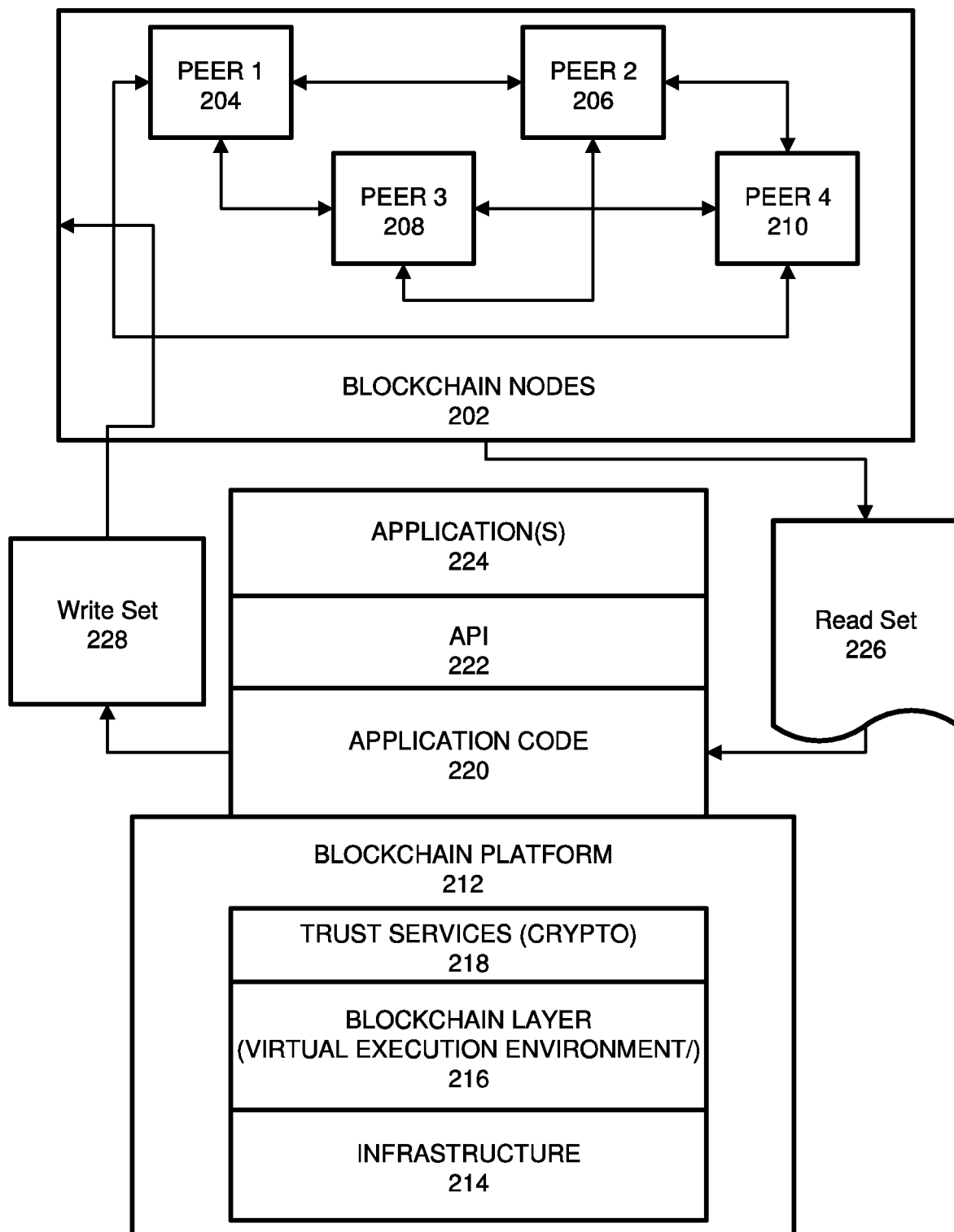
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). In some embodiments, the nodes may be service providers such as cloud service provider systems, however, the embodiments are not limited thereto. One or more of the blockchain nodes 204-210 may endorse transactions based on endorsement policy and may provide an ordering service for all blockchain nodes in the architecture 200.

A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include input data for a sub-component of a software model. Meanwhile, the write set 228 may include the execution results of the sub-component which may include input data, output data, source code of the sub-component, and the like, which are hashed.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
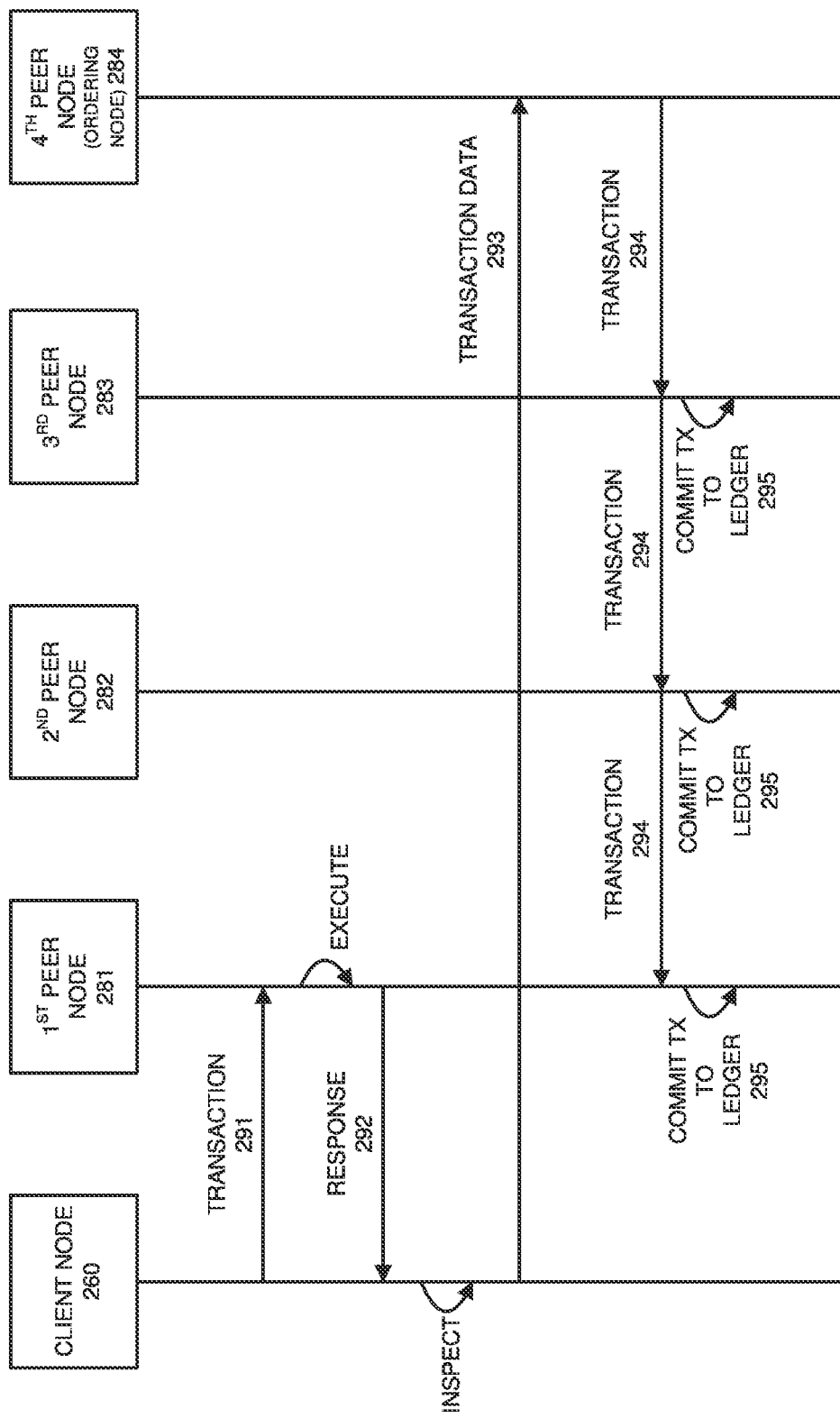
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. According to various embodiments, the transaction proposal 291 may include a request to store input data, output data, source code, and the like, regarding the execution results of a sub-component of a software model. There may be more than one endorser, but one is shown here for convenience (i.e., peer node 281). The client 260 may include an application that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
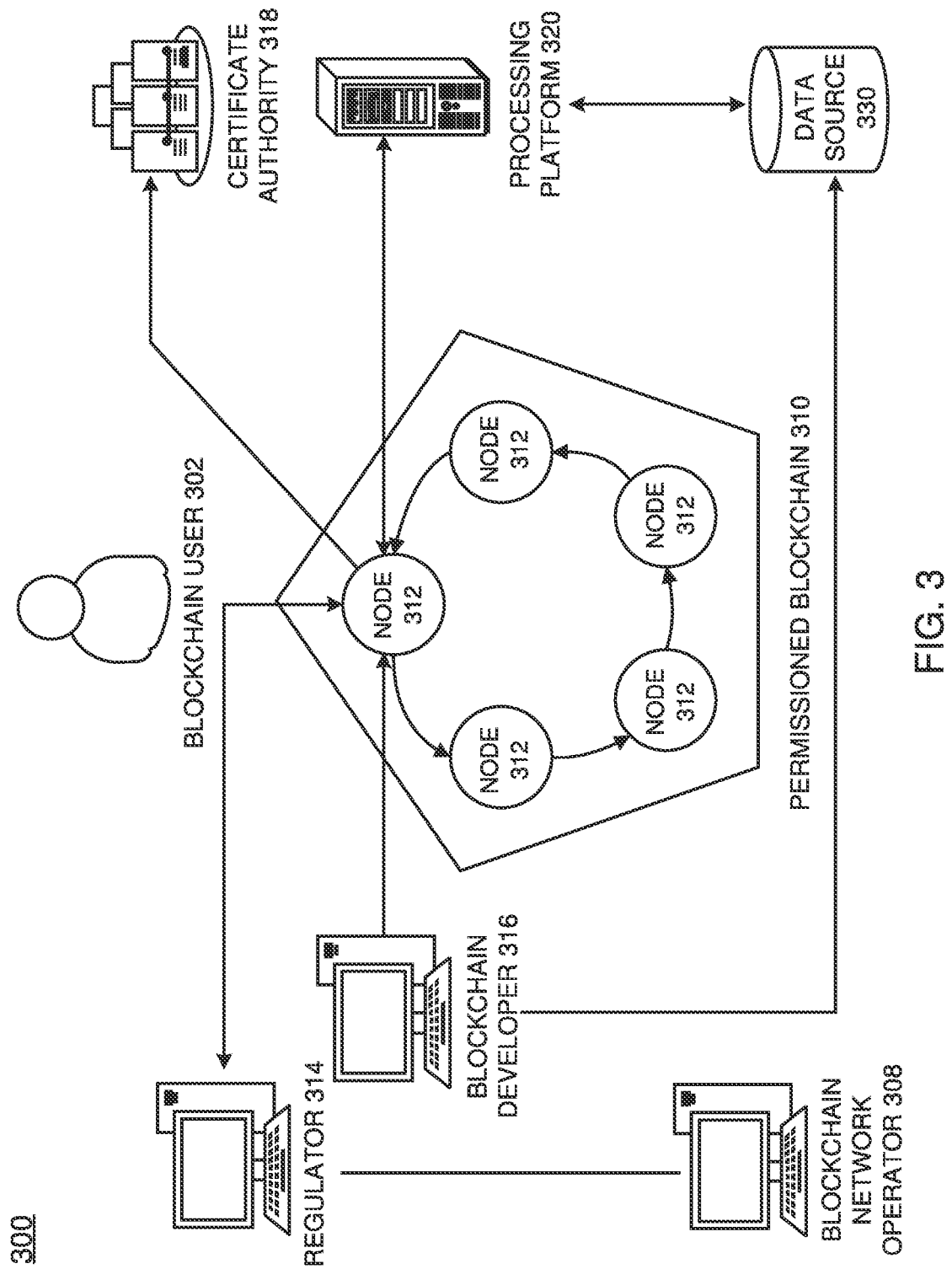
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

FIG. 4 illustrates a process 400 of sequentially executing a software model via sub-components according to example embodiments. Referring to FIG. 4, a plurality of nodes 410, 420, and 430 execute a sub-component of a model. Here, each node has an input and an output result which are associated with the execution of respective sub-component. For example, for node 410, the node receives initial input 411, executes the sub-component A, and generates an output 412. The final output 432 is the result generated by the last node 430 in the sequence. FIG. 4 illustrates two different approaches for invoking execution of a model between the nodes 410, 420, and 430. In one example, the nodes 410-430 trigger each other in sequence by calling the next node. In another example, an orchestrator 440 invokes the nodes 410-430 in sequence.

In an approach with the orchestrator 440, the result of model invocations occur in either in sequence with each node calling (e.g., via an API, etc.) the next node or independently with orchestrator coordinating the execution of subcomponents. In the sequential approach, output by one node is used as input to another node, so that the last node has the final aggregated result. In an approach with the orchestrator 440, the orchestrator 440 may have the ability to combine results of multiple nodes 410-430. In this case, each node holds a subset of the models and the orchestrator 440 chooses the sequence in which the models/nodes should be called, thereby adding another layer of obfuscation hiding.

In the approach that does not use the orchestrator 440, for a model, each node always receives request from a previous node. This enables nodes to know each other and the order of data transformation. So when nodes collude, they can recover the original model. In the alternate approach, K sub-components of the model can be stored with overlap across nodes, so that only a subset of the nodes are required to invoke the model. In this case, the order of invoking sub-components can be chosen randomly for each API call so it becomes harder for the nodes to collude and recover the model.

FIG. 5 illustrates a method 500 of executing a sub-component of a software model, according to example embodiments. For example, the method 500 may be performed by any of the nodes 120-123 within the environment 100A-100B in FIGS. 1A and 1B. Referring to the example of FIG. 5, in 510, the method may include receiving, at a node, a request to execute a software model that has been decomposed into a plurality of sequential sub-components. In some embodiments, the request may be received from a different node which executed a previous sub-component in the sequence. In some embodiments, the request may be received from an orchestrator that coordinates independent execution of the plurality of sub-components in sequence via a plurality of nodes. For example, a machine learning model may be an ensemble of several individual models each of which may be less accurate. In this case, the orchestrator coordinates the independent execution of a set of subcomponents, all of whom receive the same input data. The outputs of all subcomponents are aggregated together by the orchestrator to output the final result.

In 520, the method may include executing a sub-component from among the plurality of sub-components based on input data included in the received request to generate output data. Here, the other sub-components of the model may be hidden from the node. In 530, the method may include hashing the input data and the output data to generate a hashed execution result of the sub-component, and in 540, storing the hashed execution result of the sub-component within a block among a hash-linked chain of blocks (e.g., a blockchain) which include hashed execution results of other sub-components of the software model executed by other nodes. In some embodiments, the hashing may further include hashing code of the sub-component executed by the node to generate the hashed execution result.

In some embodiments, the method may further include aggregating the hashed execution result of the sub-component with the hashed execution results of the other sub-components to generate an aggregated execution result of the software model. In some embodiments, the method may further include outputting the aggregated execution result of the software model to a client device. In some embodiments, the method may further include transmitting, to another node, the output data and a request to execute a next sub-component among the plurality of sequential subcomponents.

Figure 6A:
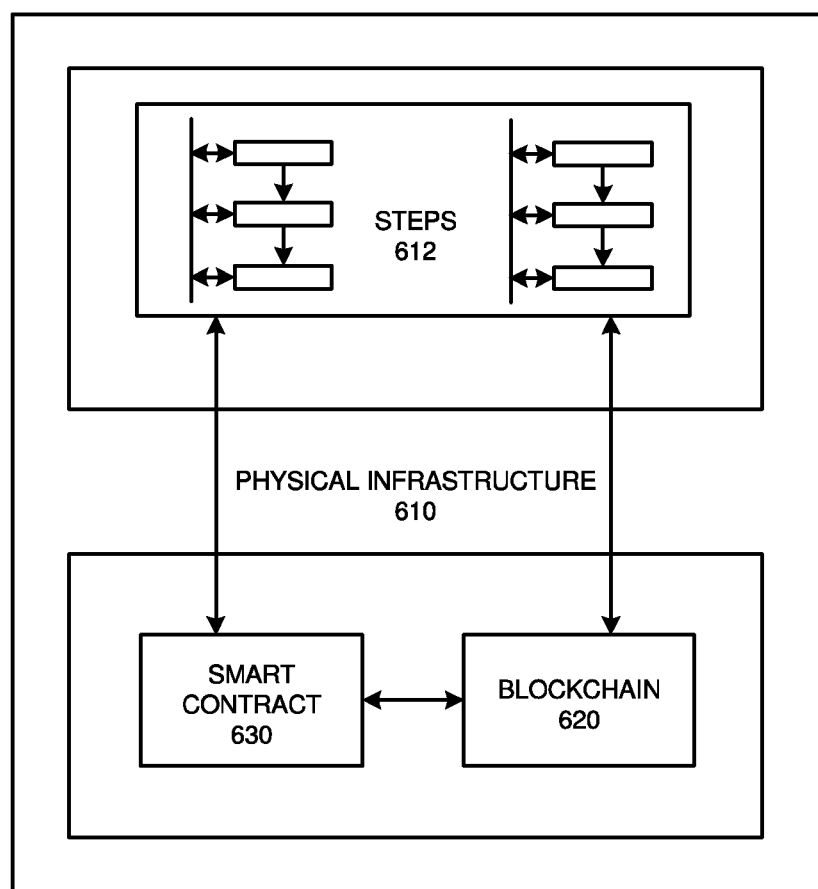
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. According to various embodiments, the steps/operations 612 may include executing a sub-component of a software model and storing hashed execution results as described or depicted in one or more flow diagrams and/or logic diagrams. The hashed execution results may include data input, data output, and source of the sub-component. The steps may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
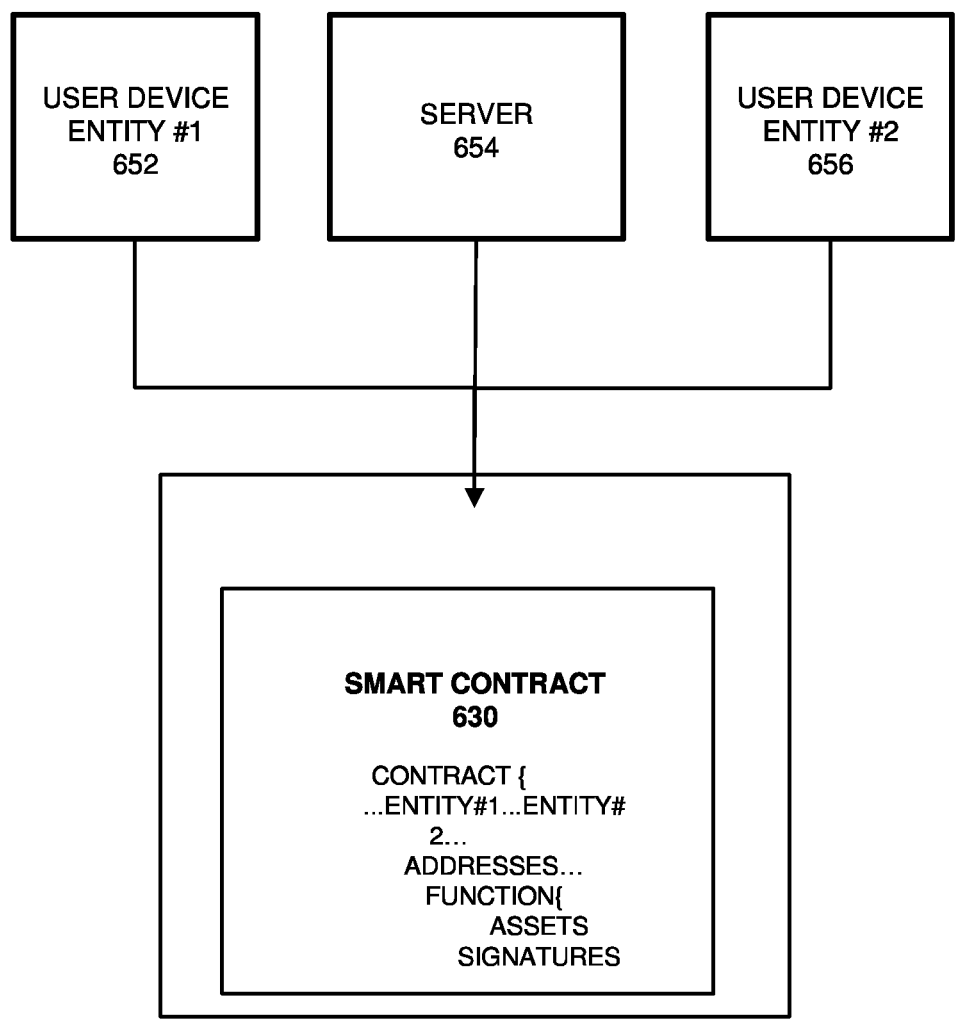
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
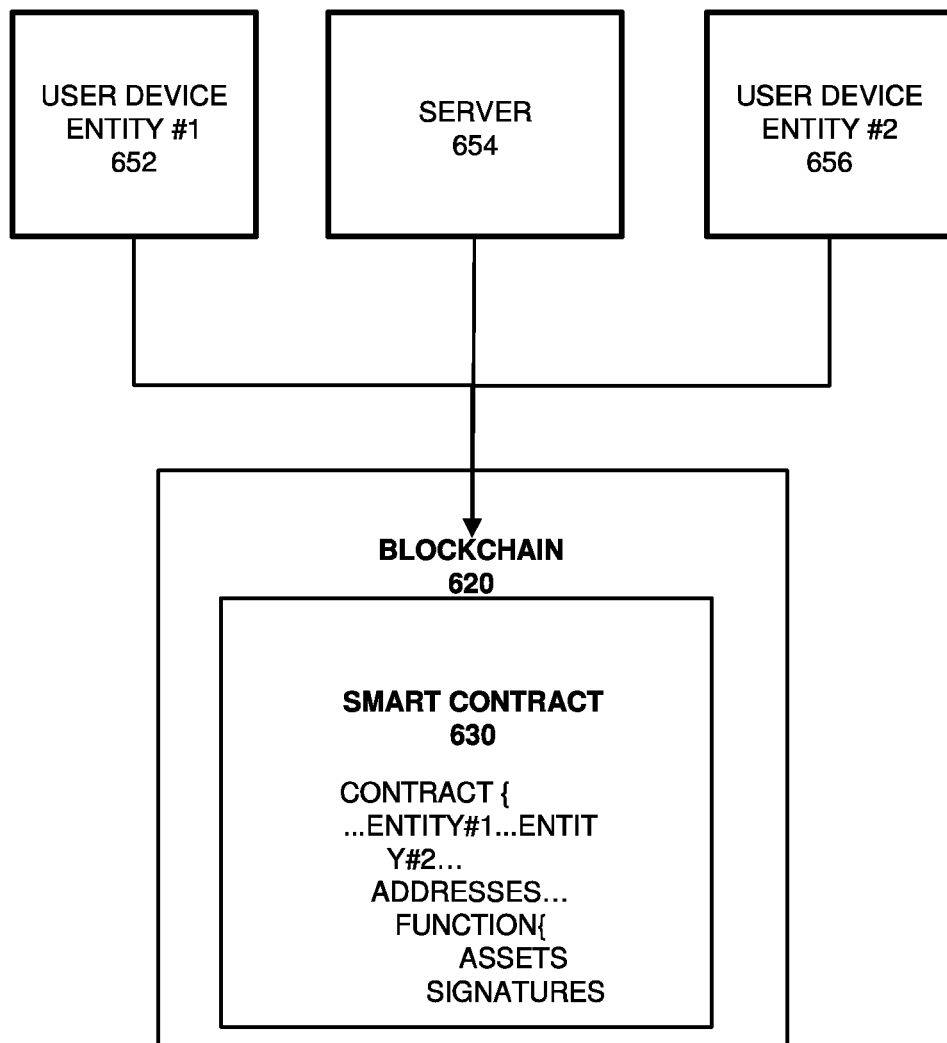
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
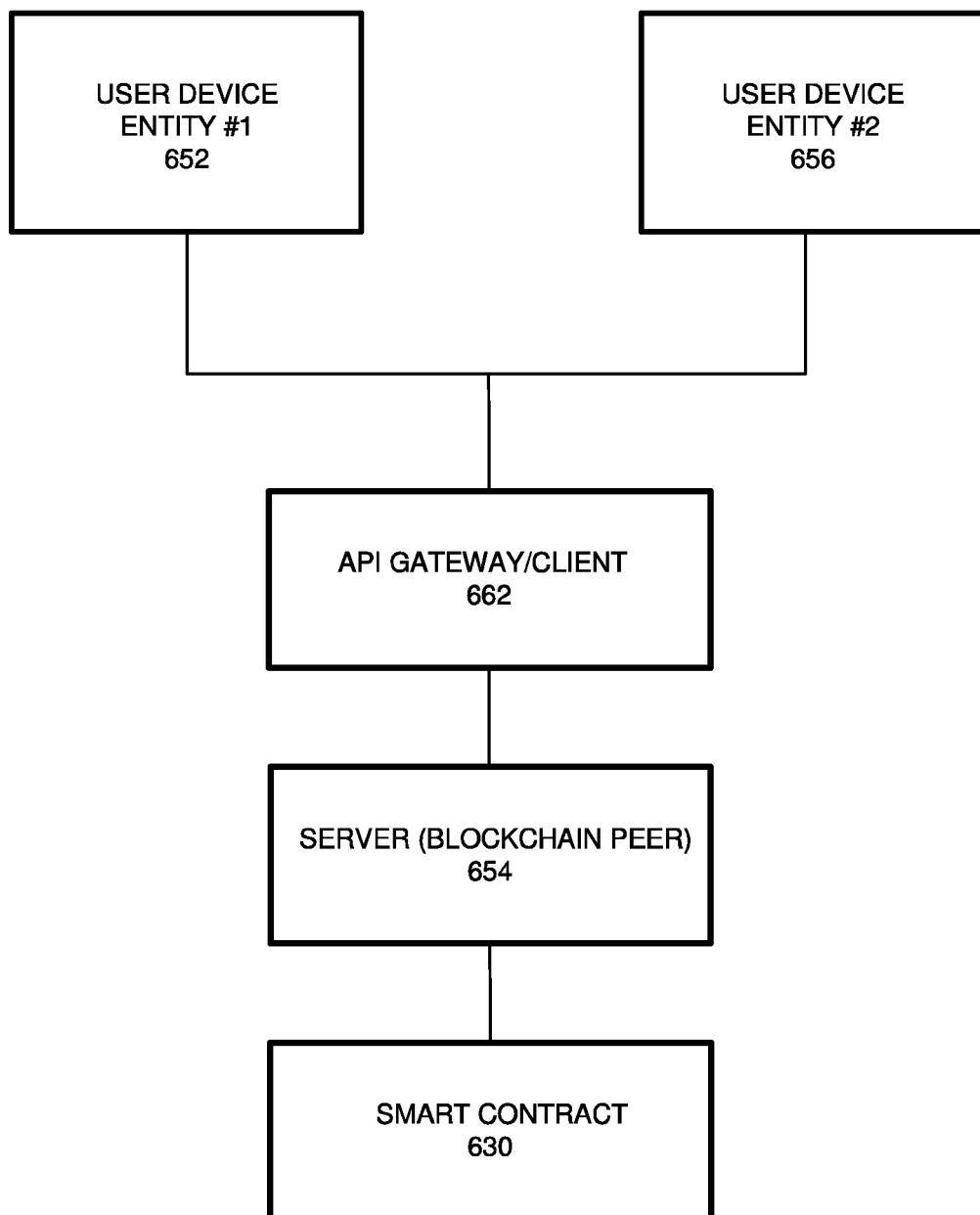
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a KVS) within a distributed ledger allowing clients 652 and 656 to query data on the world state as well as submit transactions into the blockchain network where, depending on the smart contract 630 and endorsement policy, endorsing peers will run the smart contracts 630.

Figure 7B:
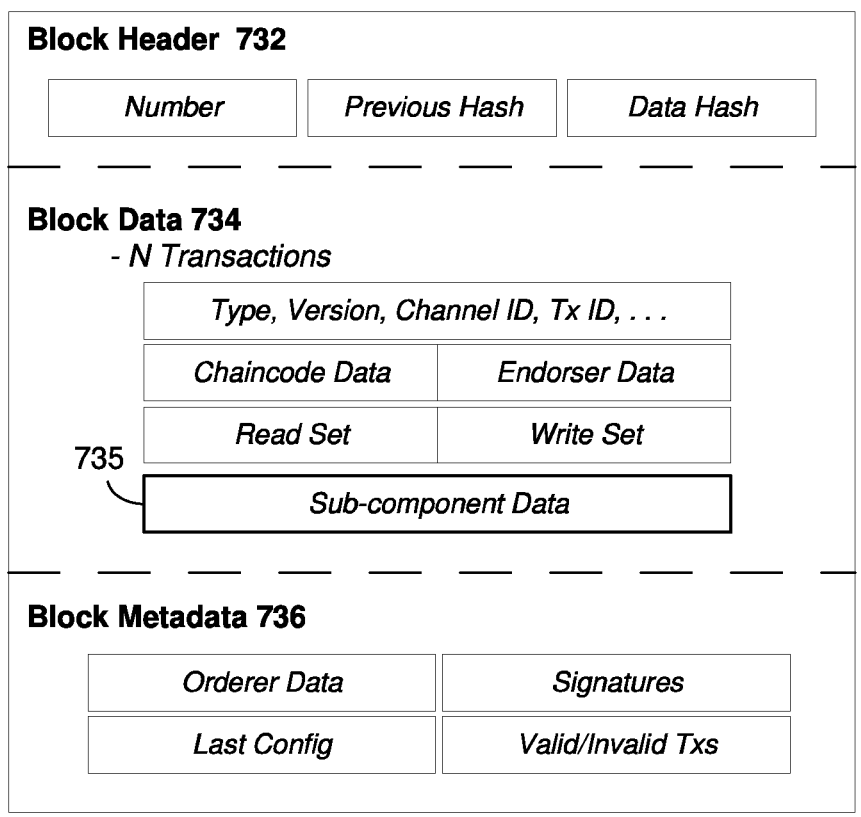
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. According to various embodiments, a model owner may provide a software model to the blockchain nodes 711, 712, and 713, and a model user may request execution of the software model from the blockchain nodes 711, 712, and 713. In some embodiments, the blockchain nodes 711, 712, and 713 may perform the role of endorser node, committer node, or both. As described herein, transactions may input data for input to a sub-component of the model being executed, output data of the sub-component being executed, source code of the sub-component, and the like.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. According to various embodiments, a smart contract may control execution of a sub-component of a software model that includes a plurality of sub-components distributed among a plurality of nodes. For an authentication, the endorsing node may attempt to decrypt a hashed execution result using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734.

According to various embodiments, each transaction may include sub-component information 735 within the block data 734 that is created by any of the peer nodes and ordered into a block by the ordering node 710. The sub-component information 735 may include one or more of the input data processed by a node when executing the sub-component, output data that results from executing the sub-component, source code of the sub-component, and the like. However, the embodiments are not limited thereto.

As another example, an end user such as an application developer may record a hash of a first input of the first sub-component of the plurality of sub-components and last output of the last sub-component of the plurality of sub-components within the block data 734. In other words, the end user may record the input of the beginning of the software model and the output of the end of the software model. This enables verifying the correctness of the input chain used by each service layer and provides non-repudiability against the output of the final service layer. As another example, the model owner may record a decomposition of a software model M into components S1 . . . SN. Also, the model owner may add a unique Model Signature such that Sig(M)=Sig(S1 . . . SN), for example, a Merkle root of the sub-components S1 . . . SN.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
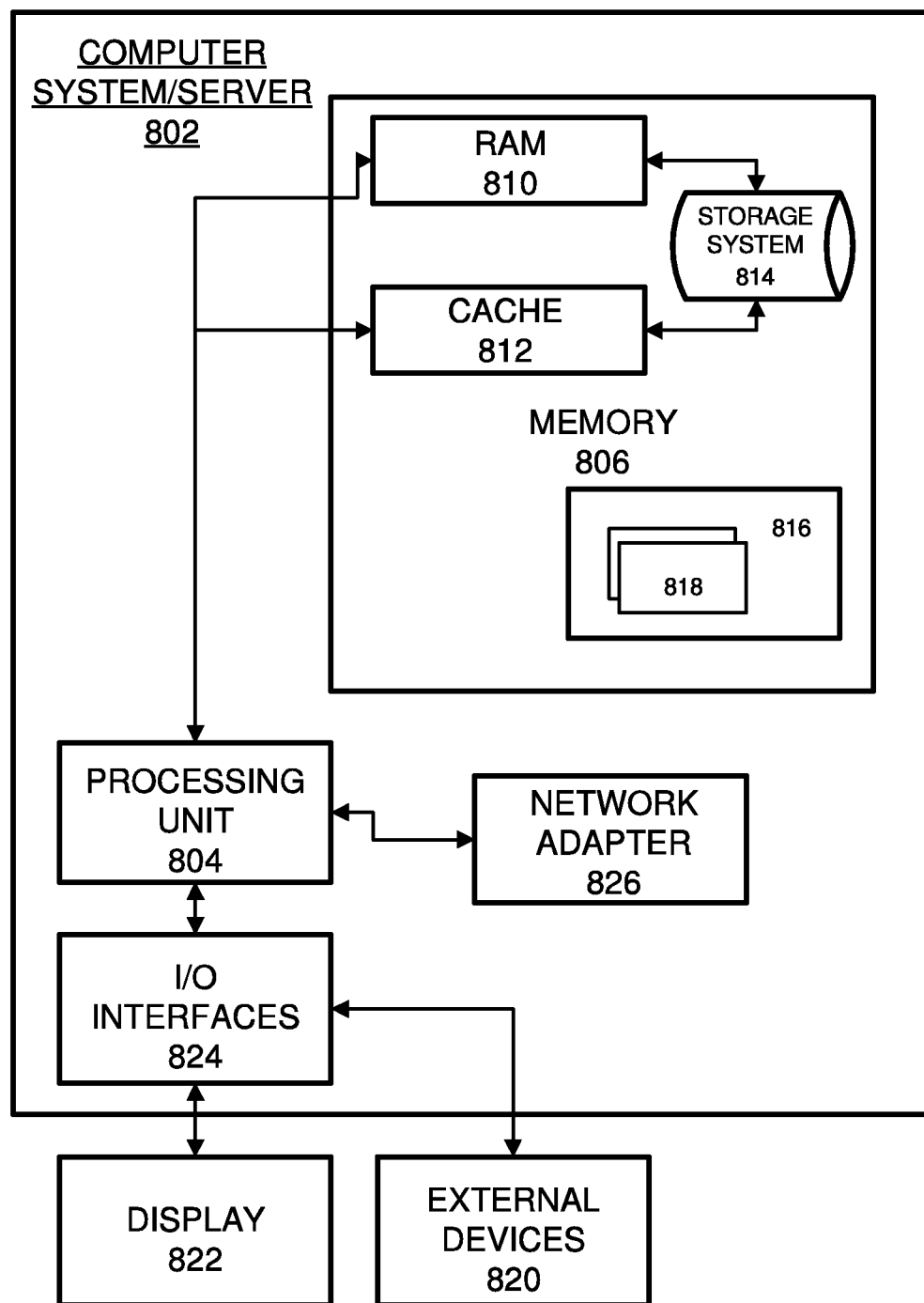
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform any of the methods 510-560 shown and described with respect to FIGS. 5A-5F.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing node comprising:
   a network interface configured to receive a request to execute a software model that has been decomposed into a plurality of sequential sub-components; and
   a processor configured to execute a sub-component from among the plurality of sub-components based on input data included in the received request to generate output data, hash the input data and the output data to generate a hashed execution result of the sub-component, and store the hashed execution result of the sub-component within a block among a hash-linked chain of blocks which include hashed execution results of other sub-components of the software model executed by other nodes;
   wherein the processor is further configured to aggregate the hashed execution result of the sub-component with the hashed execution results of the other sub-components to generate an aggregated execution result of the software model.

2. The computing node of claim 1, wherein the request is received from a different computing node which executed a previous sub-component in the sequence.

3. The computing node of claim 1, wherein the request is received from an orchestrator that coordinates independent execution of the plurality of sub-components in sequence via a plurality of computing nodes.

4. The computing node of claim 1, wherein one or more other sub-components of the software model are hidden from the computing node.

5. The computing node of claim 1, wherein the processor is further configured to hash code of the sub-component executed by the computing node to generate the hashed execution result.

6. The computing node of claim 1, wherein the network interface is further configured to transmit the aggregated execution result of the software model to a client device.

7. The computing node of claim 1, wherein the network interface is further configured to transmit, to another computing node, the output data and a request to execute a next sub-component among the plurality of sequential sub-components.

8. A method comprising:
   receiving, at a node, a request to execute a software model that has been decomposed into a plurality of sequential sub-components;
   executing a sub-component from among the plurality of sub-components based on input data included in the received request to generate output data;
   hashing the input data and the output data to generate a hashed execution result of the sub-component; and
   storing the hashed execution result of the sub-component within a block among a hash-linked chain of blocks which include hashed execution results of other sub-components of the software model executed by other nodes;
   wherein the hashed execution result of the sub-component is aggregated with the hashed execution results of the other sub-components to generate an aggregated execution result of the software model.

9. The method of claim 8, wherein the request is received from a different node which executed a previous sub-component in the sequence.

10. The method of claim 8, wherein the request is received from an orchestrator that coordinates independent execution of the plurality of sub-components in sequence via a plurality of nodes.

11. The method of claim 8, wherein one or more other sub-components of the software model are hidden from the node.

12. The method of claim 8, wherein the hashing further comprises hashing code of the sub-component executed by the node to generate the hashed execution result.

13. The method of claim 8, further comprising outputting the aggregated execution result of the software model to a client device.

14. The method of claim 8, further comprising transmitting, to another node, the output data and a request to execute a next sub-component among the plurality of sequential sub-components.

15. A non-transitory computer readable medium comprising instructions, that when read by a processor, cause the processor to perform a method comprising:
   receiving, at a node, a request to execute a software model that has been decomposed into a plurality of sequential sub-components;
   executing a sub-component from among the plurality of sub-components based on input data included in the received request to generate output data;
   hashing the input data and the output data to generate a hashed execution result of the sub-component; and
   storing the hashed execution result of the sub-component within a block among a hash-linked chain of blocks which include hashed execution results of other sub-components of the software model executed by other nodes;
   wherein the hashed execution result of the sub-component is aggregated with the hashed execution results of the other sub-components to generate an aggregated execution result of the software model.

16. The non-transitory computer readable medium of claim 15, wherein the request is received from a different node which executed a previous sub-component in the sequence.

17. The non-transitory computer readable medium of claim 15, wherein the request is received from an orchestrator that coordinates independent execution of the plurality of sub-components in sequence via a plurality of nodes.

18. The non-transitory computer readable medium of claim 15, wherein the hashing further comprises hashing code of the sub-component executed by the node to generate the hashed execution result.

* * * * *